United States Patent [19]

Pollatta et al.

[11] Patent Number: 5,593,752
[45] Date of Patent: Jan. 14, 1997

[54] LOW CTE/CME BORON/CARBON FIBER LAMINATES AND METHOD OF MAKING THEM

[75] Inventors: David J. Pollatta, Webster; Thomas N. Quinzi, East Rochester, both of N.Y.

[73] Assignee: Eastman Kodak Company, Rochester, N.Y.

[21] Appl. No.: 565,182

[22] Filed: Nov. 28, 1995

[51] Int. Cl.⁶ ...................................... B32B 5/16
[52] U.S. Cl. .......................... 428/114; 428/105; 428/113; 428/284; 428/285; 428/286; 428/294; 428/406; 428/408; 428/457; 428/461; 428/462
[58] Field of Search ...................... 428/224, 245, 428/246, 259, 265, 105, 113, 114, 284, 285, 286, 294, 406, 408, 457, 461, 462

[56] References Cited

U.S. PATENT DOCUMENTS 3,755,061  8/1973  Schurb ........................... 161/143
4,888,247  12/1989  Zweben et al. ................... 428/105
5,208,090  5/1993  Okitsu et al. .................... 428/113

FOREIGN PATENT DOCUMENTS

0436391A2  7/1991  European Pat. Off. ........ B29C 67/14

*Primary Examiner*—Patrick Ryan
*Assistant Examiner*—Richard C. Weisberger
*Attorney, Agent, or Firm*—David M. Woods

[57] ABSTRACT

A boron/carbon fiber laminate comprising a boron fiber layer and a carbon fiber layer having a balanced pair of carbon fiber plies embedded in a plastic resin matrix has a Coefficient of Thermal Expansion between ±0.54 μm/m/°C., a Coefficient of Moisture Expansion between ±20.0 μm/m/%ΔM, and a specific modulus greater than $1.64 \times 10^6$ meter. The laminate is useful for optical mounting structures.

5 Claims, 3 Drawing Sheets

LOW CTE/CME BORON/CARBON FIBER LAMINATES AND METHOD OF MAKING THEM

This invention was made with Government support under contract number FA7056-92-C-0020 awarded by the Department of Defense. The Government has certain rights in this invention.

CROSS-REFERENCE TO RELATED APPLICATION(S)

Reference is made to commonly assigned copending application Ser. No. 08/363,676, entitled "Low CTE Boron/Carbon Fiber Laminate and Method of Design" and filed on Dec. 23, 1994 in the names of David J. Pollatta and Thomas N. Quinzi.

FIELD OF THE INVENTION

The present invention relates generally to boron/carbon fiber laminates and particularly to such laminates having low coefficients of thermal expansion and simultaneously low coefficients of moisture expansion, and a method of making them.

BACKGROUND OF THE INVENTION

Optical support structures in imaging systems must possess excellent stability during testing and operations. Two of the most important structural parameters affecting stability are stiffness and Coefficient of Thermal Expansion (CTE). For composite materials, Coefficient of Moisture Expansion (CME) is also important.

The stiffness of a structural member is related to the modulus of elasticity, or modulus, for the structural material. The weight of the structural material is related to the material density. The specific modulus of a structural material is the modulus divided by the density. The specific modulus for a structural material is proportional to the stiffness to weight ratio. The specific modulus is more convenient to compute and is therefore used as a comparison parameter for structural materials.

Carbon fiber reinforced plastic (CFRP), often referred to as composite laminate materials, is a well known class of materials that is used in structural applications ranging from aircraft to fishing poles due to its high stiffness to weight ratio and high strength to weight ratio, which can be much higher than metals. The material consists of various layers, or plies, oriented and stacked in a prescribed pattern (analogous to plywood) tailored to meet the structural requirements of the member. Each layer of the laminated sheet consists of reinforcing fibers such as carbon, glass, or boron embedded in a plastic resin.

It has been demonstrated that it is possible to achieve laminates possessing near-zero CTE in one laminate direction with high stiffness and low weight using carbon fibers. The near-zero CTE attainable is equal to or lower (better) than that of Invar, a steel alloy with the lowest CTE possessed by a traditional metal material (0.54 μm/m/°C.).

It has also been demonstrated that it is possible to achieve laminates possessing near-zero CME in one laminate direction with high stiffness and low weight. Metallic materials do not absorb atmospheric moisture (are not hygroscopic), therefore, the CME of any metal, including Invar, is 0 μm/m/%ΔM. Currently available instruments for measuring CME are capable of accuracies of ±20 μm/m/%ΔM. For this reason, near zero CME is defined herein as within ±20 μm/m/%ΔM.

The stiffness to weight ratio of Invar is well below that which can be achieved with near-zero CTE and near-zero CME carbon fiber composite laminates.

The CTE of a laminate, as well as its strength and stiffness, is determined by the type of fiber selected, the orientation of each layer of those fibers, and the fiber volume fraction (ratio of the volume of fibers to the total volume of the laminate). Carbon fibers have a negative CTE in the direction of the fiber. In general, the CTE varies with the modulus of the fiber, i.e. the stiffer the fiber, the more negative the CTE. Resins have a positive CTE. For a given fiber, resin, and fiber volume fraction, it is necessary to orient some or all of the carbon fibers at some ±Theta angle relative to the reference direction in order to produce a laminate with a near-zero CTE in that direction. However, as the Theta angle is increased, the modulus of the laminate decreases. Currently carbon fibers in the 210–345 GPa ($10^9$ Pascal) modulus range produce the highest stiffness to weight ratio laminates with near-zero CTE. Higher modulus carbon fibers (520–900 GPa) can also be used to achieve near-zero CTE laminates. Again, these fibers generally have a larger negative CTE than the 210–345 GPa modulus fibers. Consequently, larger ply angles (±Theta) are required to achieve near-zero CTE. The resulting laminate modulus and therefore, specific modulus, is equal to or less than the 210–345 GPa modulus carbon fibers. The high negative CTE of the high modulus fibers prohibits increasing the laminate specific modulus above that attained by the 210–345 GPa fibers.

The CME of the laminate is also determined by the type of fiber selected, the orientation of each layer of fibers, the fiber volume fraction, and the CME of the resin. The resins used for composite laminates absorb atmospheric moisture. Carbon and boron fibers, in general, do not absorb atmospheric moisture. As the resin absorbs or desorbs moisture, the laminate will expand or contract in length. The amount of expansion or contraction per unit length and per unit change in moisture content is defined as the Coefficient of Moisture Expansion (CME). For a given fiber, resin, and fiber volume fraction, it is necessary to orient some or all of the carbon fibers at some ±Theta angle relative to the reference direction in order to produce a laminate with a near-zero CME in that direction. Currently carbon fibers in the 210–900 GPa ($10^9$ Pascal) modulus range produce high stiffness to weight ratio laminates with near-zero CME.

The current state of the art carbon laminates can be utilized to produce structural components with the CTE equivalent to or lower than Invar, at a much higher specific modulus, or structural components with CME equal to the zero CME of Invar at a much higher specific modulus. Currently, a carbon-fiber laminate does not exist that possesses both near-zero CTE and near-zero CME. There exists a need for structural components with near-zero CTE and simultaneously, near-zero CME while maintaining higher specific modulus. This need to achieve near-zero CTE simultaneously with near-zero CME is driven by a demand to further reduce hygrothermal excursions by structural components operating in an environment with changing temperature and relative humidity.

SUMMARY OF THE INVENTION

This invention proposes a fiber reinforced resin laminate with both near-zero CTE and near-zero CME with higher specific modulus by mixing layers of positive CTE, high stiffness boron fiber with layers of negative CTE high modulus (210–900 GPa) carbon fiber. The positive CTE boron fibers compensate for the negative CTE of the carbon fibers, thus allowing the higher modulus carbon fibers to be more fully utilized. By selecting the fiber volume fraction of the boron fiber (between 0.50 and 0.66), the fiber volume fraction of the carbon fiber (between 0.50 and 0.66), and ply orientation angles (between 0 and 90 degrees), a laminate with near-zero CTE (CTE between ±0.54 μm/m/°C.), near-zero CME (CME=0.0±20.0 μm/m/%ΔM) and greater specific modulus ($8.2 \times 10^6$ meter to $21.4 \times 10^6$ meter) than previously possible is obtained.

Since a wider range of carbon fibers (210–900 GPa) can be combined with boron to produce near-zero CTE and near-zero CME laminates, the invention may also be used to provide a wider range of laminate stiffness values that can be used to tailor the dynamic response of a structure or structural member. The dynamic response can be tailored while maintaining a near-zero CTE and near-zero CME structure or structural member.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
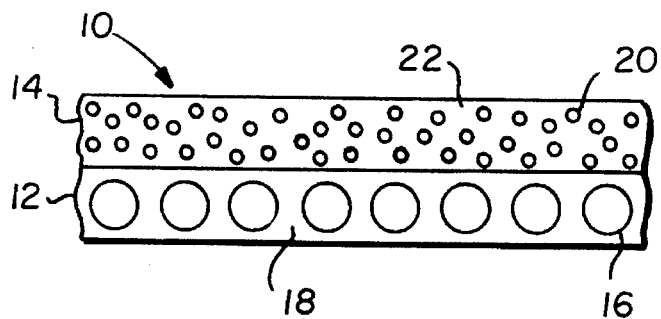
FIG. 1 is a schematic cross section of a boron/carbon fiber laminate according to the present invention.

FIG. 1 is a schematic cross section of a high specific modulus, near-zero CTE, near-zero CME laminate according to the present invention. The general laminate is designated 10 and is composed of boron fiber layer 12 comprised of one or more balanced boron fiber plies and one or more carbon fiber layers 14 comprising balanced pairs of carbon fiber plies. The boron fibers 16 reinforce a resin matrix 18. The boron fibers 16 combined with the resin matrix 18 constitute the boron fiber ply 12. The carbon fibers 20 reinforce a resin matrix 22. The carbon fibers 20 combined with the resin matrix 22 constitute the carbon fiber ply 14. The boron and carbon fiber plies are generally arranged at an angle relative to each other.

Figure 2A:
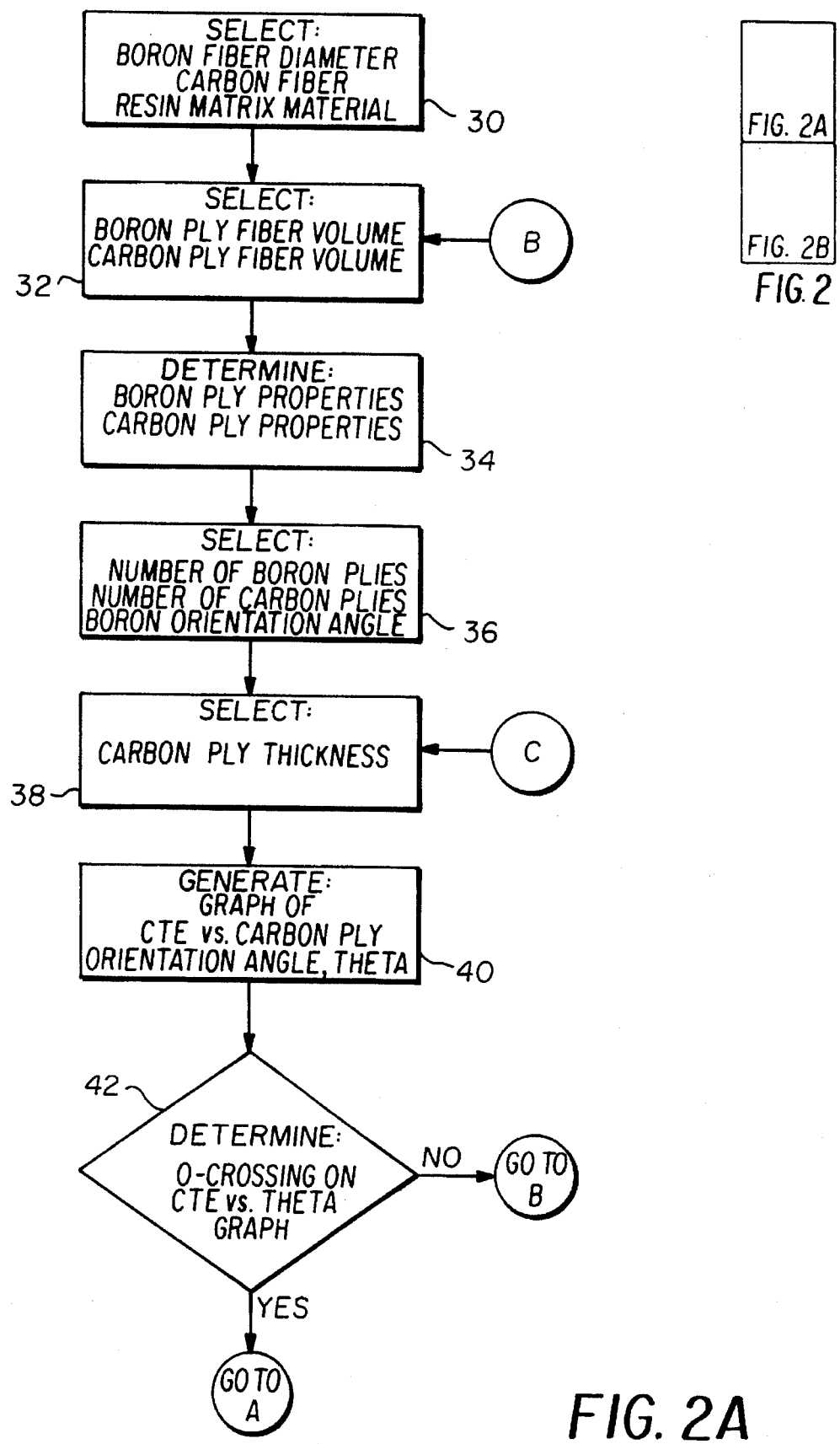
FIG. 2 is a flow chart describing a method of designing a boron/carbon fiber laminate according to the present invention.
Figure 2B:
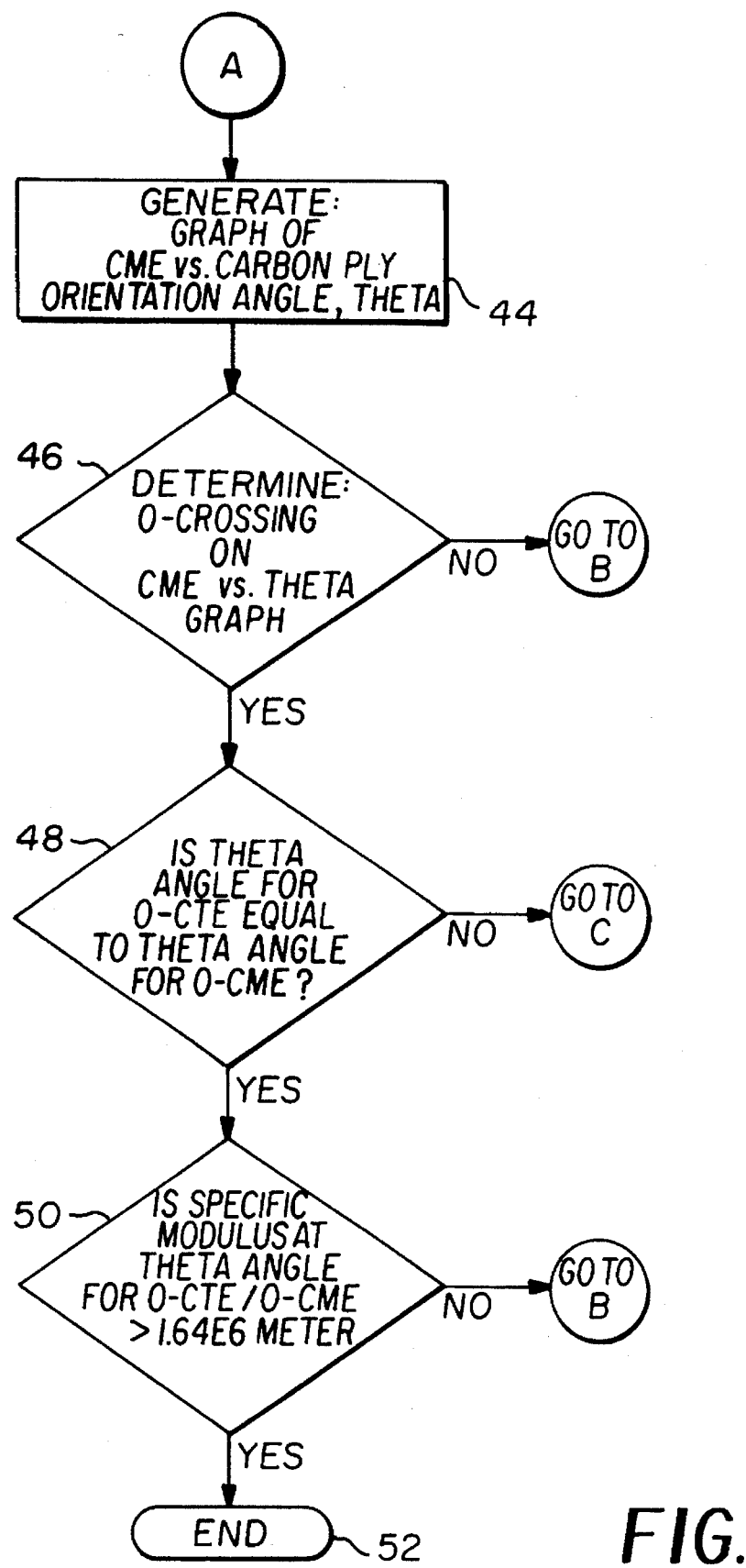

FIG. 2 is a flowchart of the process required to design a high specific modulus, near-zero CTE, near-zero CME laminate according to the present invention. The process begins at step 30 where the boron fiber diameter is selected. Boron fibers are readily available in 75 μm, 100 μm, and 140 μm diameters (other diameters can be made available as well). At step 30, the carbon fiber is selected as well as the resin matrix material. A wide variety of carbon fiber and resin materials are readily available. The laminate design proceeds to step 32 where the fiber volume fractions for the boron plies and carbon plies are selected. With the information from steps 30 and 32, ply properties for the boron plies and carbon plies are determined at step 34. The ply properties are determined by using data supplied by the fiber and/or resin manufacturer(s), testing the materials selected in step 30 at the fiber volume fractions selected in step 32, or using micro mechanics to compute ply properties from the mechanical properties of the fiber and resin. A description of the micro mechanics theory employed in such computation is found for example in Mechanics of Composite Materials, Robert M. Jones, Copyright 1975 by the Scripta Book Company, Washington, D.C. Any method or combination of methods may be used to determine the ply properties. The number of boron fiber plies, number of carbon fiber plies, and boron orientation angle are selected at step 36. The thickness of the carbon plies is selected at step 38.

The laminate is analyzed using the data generated in step 34 and the laminate parameters selected in steps 36 and 38. The laminate analysis is performed at step 40 using classical lamination theory found in the textbook by Jones on composite mechanics noted above. A computer program package for performing the analysis is sold as Mic-Mac from Think Composites, Palo Alto, Calif. The laminate analysis is used at step 40 to generate a graph of laminate CTE versus the orientation angle, Theta, of the carbon fiber plies. The carbon fiber plies are used in pairs. One ply orientation angle is +Theta, the other ply orientation angle is −Theta. This forms a balanced pair of carbon fiber plies. At step 42 the graph of laminate CTE versus orientation angle is examined for values of Theta where the laminate CTE is zero. If a zero-CTE value is not obtained the process is redirected from step 40 to step 32. At this point new fiber volume fractions are selected for the boron plies and/or the carbon plies. The process continues through steps 34, 36, 38, 40, and 42. A new graph of laminate CTE versus orientation angle Theta is generated at step 40. At step 42 the graph of laminate CTE versus orientation angle is again examined for values of Theta where the laminate CTE is zero. This process loop is continued until a zero-CTE value is found. When a zero-CTE value is obtained the process continues to step 44. Laminate analysis is used at step 44 to generate a graph of laminate CME versus the orientation angle, Theta, of the carbon fiber plies. At step 46 the graph of laminate CME versus orientation angle is examined for values of Theta where the laminate CME is zero. If a zero-CME value is not obtained the process is redirected from step 46 to step 32. At this point new fiber volume fractions are selected for the boron plies and/or the carbon plies. The process continues through steps 34, 36, 38, 40, 42, 44, and 46. A new graph of laminate CME versus orientation angle Theta is generated at step 44. At step 46 the graph of laminate CME versus orientation angle is again examined for values of Theta where the laminate CME is zero. This process loop is continued until a zero-CME value is found. When a zero-CME value is obtained the process continues to step 48. At step 48, the Theta value obtained from step 42 is compared to the Theta value obtained in step 46. If the values are not equal the process is redirected from step 48 to step 38 where a new thickness value of the carbon fiber ply is selected. The process continues through steps 40, 42, 44, 46, and 48. At step 48 the Theta value obtained in step 42 is again compared to the Theta value obtained in step 46. This process loop continues until the Theta value obtained in step 42 is equal to the Theta value obtained in step 46. At step 50, the Theta value obtained at step 48 is used to determine the specific modulus value at the zero-CTE, zero-CME, orientation angle, Theta. The specific modulus obtained is compared to the specific modulus of Invar which has a value of $1.64 \times 10^6$ meter. If the specific modulus obtained is less than $1.64 \times 10^6$ meter the process is redirected from step 50 to step 32. If the specific modulus obtained is greater than $1.64 \times 10^6$ the process is ended at step 52. This process yields a near-zero CTE and near-zero CME laminate with a specific modulus greater than that which was previously available in the prior art.

The near-zero CTE, near-zero CME laminate obtained by the process outline in FIG. 2 is fabricated using well known manufacturing processes and techniques. Unidirectional prepreg tape is the ply material used in the manufacturing process. The prepreg tape consists of bundles of fibers or fiber tows for carbon plies, or fiber monofilaments for boron plies. The fibers are dispersed or arranged such that they are parallel to one another. The fibers or monofilaments are precoated with uncured resin prior to dispersing or arranging in parallel. The pre-coated fibers or monofilaments form the prepreg tape. The prepreg tape is typically from 75 μm to 375 μm thick. Typical resins used are epoxies and cyanate esters. All combinations of carbon and boron fibers, and epoxies and cyanate ester resins are available in prepreg tape.

The composite laminate is prepared, or layed-up, by applying layers of prepreg tape on a tool with the orientation angles for the boron and carbon plies determined in the process outlined in FIG. 2. Upon completion of lay-up, the uncured laminate is cured at the prepreg manufacturers recommended temperature and pressure, most usually in an autoclave. After curing, the laminate is trimmed to the final shape and is ready for use.

WORKING EXAMPLE

Figure 3:
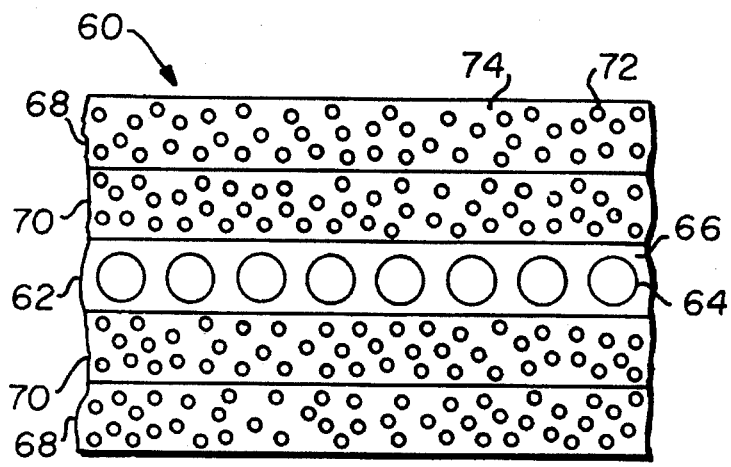
FIG. 3 is a schematic cross section of a working example of a boron/carbon fiber laminate according to the present invention.

FIG. 3 shows a schematic cross section of a high specific modulus laminate with near-zero CTE and near-zero CME in one direction. The general laminate is designated 60 and is composed of a single boron fiber ply 62 with boron fibers 64 aligned parallel to the reference direction and embedded in a cyanate ester thermosetting resin 66. The boron fiber ply 62 is embedded between two pairs of carbon fiber plies 68 and 70. The carbon fibers 72 are embedded in a cyanate ester thermosetting resin 74. The carbon fibers 72 in the two outside carbon fiber plies 68 are at a +Theta orientation angle relative to the boron fibers 64. The carbon fibers 72 in the two inner carbon fiber plies 70 are at a −Theta orientation angle relative to boron fibers 64. The five layer laminate 60 or multiples of the five layer laminate 60 are co-cured using standard composite laminate curing techniques.

The laminate for this example was designed using the process described in FIG. 2. A 100 μm diameter boron (400 GPa) fiber (manufactured by Textron Specialty Materials) and an M60J (520 GPa) carbon fiber (manufactured by Toray Industries, Inc.) were selected. The matrix material selected was the 954-3 cyanate ester thermosetting resin (manufactured by ICI Fiberite). One boron fiber ply and four carbon plies were selected. The fiber volume fraction for the boron fiber ply was set to 0.65. The fiber volume fraction for the carbon fiber plies was set to 0.62. The boron fiber ply thickness was set to 100 μm. The carbon fiber ply thickness was set to 58 μm. The boron orientation angle was set to zero-degrees. A graph of laminate CTE versus M60J carbon fiber ply orientation angle gave a zero-value at Theta equal to 9.25 degrees. A graph of laminate CME versus M60J carbon fiber ply orientation angle also gave a zero-value at Theta equal to 9.25 degrees. The specific modulus for this laminate in the direction parallel to the boron fibers was $16.1 \times 10^6$ meter. The specific modulus for this laminate is calculated to be 880% above the $1.64 \times 10^6$ meter specific modulus attainable with Invar. The CTE for this laminate in the direction parallel to the boron fibers was calculated to be −0.00018 μm/m/°C. The CME for this laminate was calculated to be 0.25 μm/m/%ΔM. This laminate is one example representative of the family of laminates that exist by combining boron and M60J prepreg tape.

Figure 4:
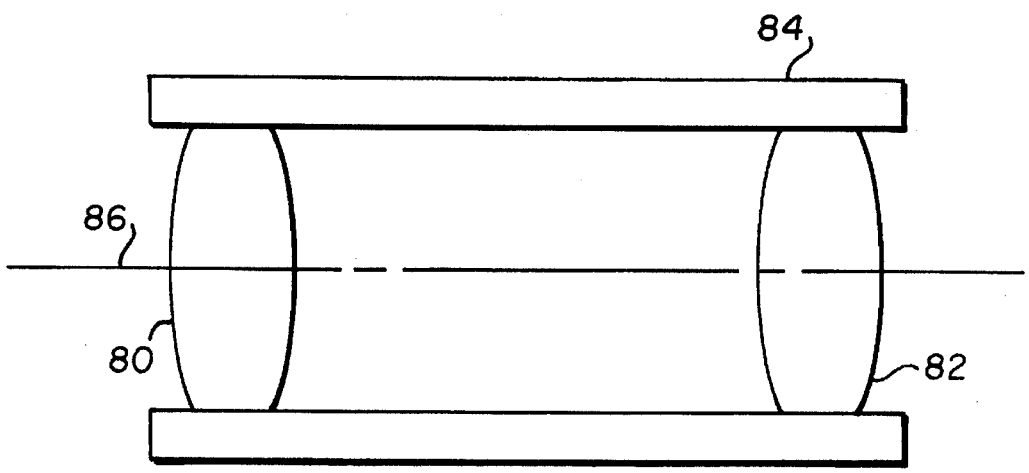
FIG. 4 is a schematic of an optical support structure using a boron/carbon fiber laminate according to the present invention.

The laminate described in this example may be utilized in the optical system shown in FIG. 4. Optical elements 80 and 82 are mechanically supported by the lens tube 84. The lens tube 84 is constructed of the laminate described above in the Working Example. The near-zero CTE and near-zero CME laminate would be utilized such that the uniaxial boron ply is parallel to the centerline of the lens tube 86. The CTE parallel to this direction is calculated to be −0.00018 μm/m/°C. The CME parallel to this direction is calculated to be 0.25 μm/m/%ΔM. The distance between optical element 80 and optical element 82 will not change significantly as the optical system temperature and relative humidity change during testing or operation of the optical system due to the near-zero CTE and near-zero CME of the lens tube. The high specific modulus results in less material required than is required with Invar to achieve a particular stiffness value. A lens tube 84 of near-zero CTE, near-zero CME, and higher stiffness than that which is possible with Invar, can be achieved with the laminate described above.

COMPARISON TO WORKING EXAMPLE

The laminate described in the Working Example is compared to low-CTE, zero-CME Invar. The specific modulus for the laminate in the Working Example was calculated to be $16.1 \times 10^6$ meter. This specific modulus is calculated to be 880% above the $1.64 \times 10^6$ meter specific modulus attainable with Invar. To obtain a given structural stiffness, much less material is required when using the laminate in the Working Example since the specific modulus is much greater.

The CTE of the laminate described in the Working Example is calculated to be −0.00018 μm/m/°C. This CTE is well below the 0.54 μm/mm/°C. of Invar.

The CME of the laminate described in the Working Example is calculated to be 0.25 μm/m/°C. This CME is approximately equal to 0-CME Invar.

The Working Example described above is just one example representative of the family of solutions that exist by combining boron fiber and M60J fiber. The invention is not restricted to a particular boron fiber diameter, or to a particular carbon fiber, or to a particular matrix material. The present example is intended to illustrate the invention and does not restrict the invention.

PARTS LIST

10 general laminate
12 boron fiber layer
14 carbon fiber layer
16 boron fibers
18 resin matrix
20 carbon fibers
22 resin matrix
30 select fiber and resin step
32 select ply fiber volume step
34 determine ply property step
36 select number of plies and orientation angle step 38 select ply thickness step
40 generate graph step
42 zero crossing test step
44 generate graph step
46 zero crossing test step
48 theta angle test step
50 specific modulus test step
52 end step
60 general laminate
62 boron fiber ply
64 boron fibers
66 cyanate ester thermosetting resin
68 carbon fiber plies
70 carbon fiber plies
72 carbon fibers
74 cyanate ester thermosetting resin
80 optical element
82 optical element
84 lens tube
86 centerline of lens tube

We claim:

1. A boron/carbon laminate comprising a boron fiber ply consisting essentially of continuous unidirectional boron fibers, a carbon fiber layer having a balanced pair of carbon fiber plies, each carbon fiber ply consisting essentially of continuous unidirectional carbon fibers oriented at ±Theta with respect to a reference direction, said laminate having a Coefficient of Thermal Expansion between ±0.54 μm/m/°C., a Coefficient of Moisture Expansion between ±20.0 μm/m/%ΔM, and a specific modulus greater than $1.64 \times 10^6$ meter, said fiber plies being embedded in a plastic resin matrix.

2. The boron/carbon laminate claimed in 1, comprising a single uniaxial boron fiber ply, two pairs of balanced carbon fiber plies oriented at ±9.25°, having a Coefficient of Thermal Expansion of −0.00018 μm/m/°C., a Coefficient of Moisture Expansion of 0.25 μm/m/%ΔM, and a specific modulus of $16.1 \times 10^6$ meter, said fiber plies being embedded in a thermosetting resin matrix.

3. The boron/carbon laminate claimed in claim 1, wherein said boron fiber layer comprises a balanced pair of boron fiber plies.

4. The boron/carbon laminate claimed in claim 2, wherein said thermosetting resin matrix is 954-3 cyanate ester.

5. The boron/carbon laminate claimed in claim 3, wherein said carbon fiber is M60J.

* * * * *